US008121814B2

(12) United States Patent
Abe et al.

(10) Patent No.: US 8,121,814 B2
(45) Date of Patent: Feb. 21, 2012

(54) THREE-DIMENSIONAL PROCESSOR AND METHOD FOR CONTROLLING DISPLAY OF THREE-DIMENSIONAL DATA IN THE THREE-DIMENSIONAL PROCESSOR

(75) Inventors: Yoshihisa Abe, Sakai (JP); Toshio Kawano, Sakai (JP)

(73) Assignee: Konica Minolta Sensing, Inc., Osaka (JP)

( * ) Notice: Subject to any disclaimer, the term of this patent is extended or adjusted under 35 U.S.C. 154(b) by 435 days.

(21) Appl. No.: 12/322,963

(22) Filed: Feb. 10, 2009

(65) Prior Publication Data
US 2009/0201292 A1    Aug. 13, 2009

(30) Foreign Application Priority Data
Feb. 13, 2008   (JP) .................. 2008-032352

(51) Int. Cl.
*G01B 21/02* (2006.01)
*G01B 21/00* (2006.01)
*G06F 19/00* (2011.01)
*G06F 17/40* (2006.01)

(52) U.S. Cl. ........ 702/167; 340/678; 345/419; 702/187; 702/189

(58) Field of Classification Search ............ 33/1 R, 33/501; 73/104, 106, 865.8, 866.3; 340/500, 340/540, 678; 345/418, 419; 356/2, 600, 356/601; 382/100, 108; 702/1, 85, 94, 95, 702/127, 155, 167, 187, 189, 190; 714/1, 714/100; 715/700, 764, 781
See application file for complete search history.

(56) References Cited

U.S. PATENT DOCUMENTS

| 4,845,763 | A | 7/1989 | Bandyopadhyay et al. |
| 5,753,931 | A | 5/1998 | Borchers et al. |
| 6,141,105 | A | 10/2000 | Yahashi et al. |
| 6,172,755 | B1 | 1/2001 | Norita et al. |
| 2002/0005956 | A1 * | 1/2002 | Kiyoi ............... 356/601 |

FOREIGN PATENT DOCUMENTS

| EP | 2090864 A1 * | 8/2009 |
| FR | 2 654 826 A1 | 5/1991 |
| JP | 09-145633 | 6/1997 |
| JP | 09-325009 | 12/1997 |
| JP | 2006-23178 | 1/2006 |

OTHER PUBLICATIONS

European Official Communication dated May 28, 2009 for corresponding European Application No. 09 15 2657.4, 8 pages.

* cited by examiner

*Primary Examiner* — Edward Cosimano
(74) *Attorney, Agent, or Firm* — Brinks, Hofer, Gilson & Lione

(57) ABSTRACT

A method is provided for controlling display of three-dimensional data in a three-dimensional processor that processes three-dimensional data indicating three-dimensional position coordinates of each point on a surface of an object to be measured, the three-dimensional data being obtained by projecting measurement light onto the object and receiving measurement light reflected from the object. The method includes obtaining reliability data that are an index of reliability of three-dimensional data of said each point, enabling a user to adjust a threshold for defining a range of the reliability, and displaying, on a screen of a display, three-dimensional data corresponding to reliability falling within a range defined by the threshold adjusted by the user with the three-dimensional data displayed distinguishably from different three-dimensional data.

11 Claims, 20 Drawing Sheets

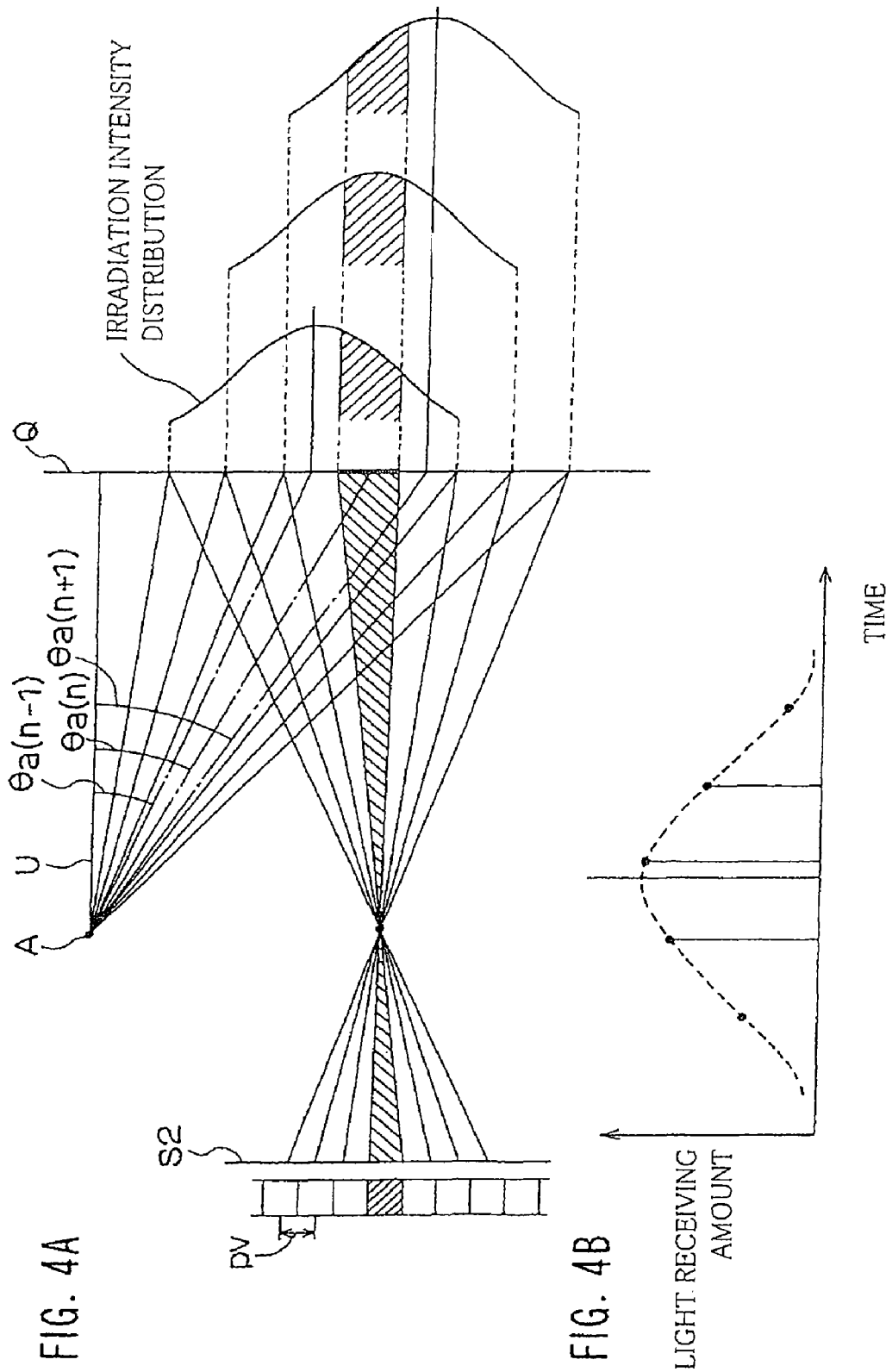

DISPLAY OF DZb

NON-DISPLAY OF DZc

NON-DISPLAY OF DZd

FIG. 16
BS1 — th1 
BS2 — th2 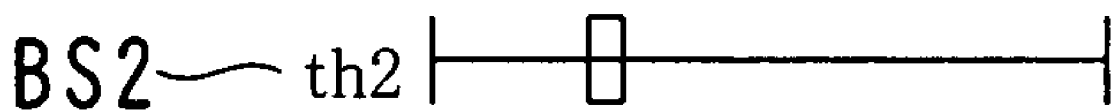
BS3 — th3 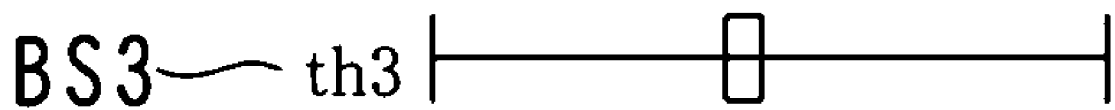

THREE-DIMENSIONAL PROCESSOR AND METHOD FOR CONTROLLING DISPLAY OF THREE-DIMENSIONAL DATA IN THE THREE-DIMENSIONAL PROCESSOR

This application is based on Japanese patent application No. 2008-032352 filed on Feb. 13, 2008, the contents of which are hereby incorporated by reference.

BACKGROUND OF THE INVENTION

1. Field of the Invention

The present invention relates to a three-dimensional processor for processing three-dimensional data obtained by measurement with a three-dimensional measurement device using, for example, a light projection method, a method for controlling display of the three-dimensional data in the three-dimensional processor, and a computer program product.

2. Description of the Related Art

A three-dimensional measurement device using a light section method, which is a kind of the light projection method, obtains raw measurement data by projecting slit light, as measurement light, onto an object to be measured, optically scanning the object with the slit light, and receiving the measurement light reflected from the object (reflected light) with an image sensor. The raw measurement data thus obtained are used to perform an operation for three-dimensional processing based on the principle of triangulation, so that three-dimensional data (also called three-dimensional coordinate data, coordinate data, or distance data) indicating three-dimensional position coordinates of each point on the surface of the object are obtained (Japanese Laid-open Patent Publication No. 9-325009).

Three-dimensional data obtained by a three-dimensional measurement device are data indicating three-dimensional position coordinates of a plurality of points on the surface of an object to be measured, or a set of such data. A plurality of pieces of three-dimensional data obtained by performing measurement on different parts of the object is combined with one another; thereby, three-dimensional shape data (a three-dimensional model) of the entire surface of the object can be obtained. Alternatively, raw measurement data obtained by a three-dimensional measurement device may be transferred to a computer and the computer performs an operation for three-dimensional processing. Note that the light projection method in which spot light, step light, or density pattern light is projected instead of slit light is also known.

In the case where a three-dimensional measurement device is used to perform measurement on an object to be measured and the intensity of a signal of reflected light from the object is substantially high or substantially low, accurate data may not be obtained. For example, when the signal intensity is substantially high, the output of an image sensor is saturated and, therefore, the correct light-receiving position cannot be specified. As a result, accurate data cannot be obtained. The signal intensity is substantially high in the case where specular reflection or reflection similar thereto occurs on the surface of the object. On the other hand, when the signal intensity is substantially low, the S/N ratio deteriorates due to noise. As a result, accurate data cannot be obtained. The signal intensity is substantially low, for example, in the case where the object is distant from the three-dimensional measurement device or the normal direction of the surface of a part of the object is not toward the three-dimensional measurement device and the angle of incidence of measurement light is substantially large.

In order to deal with the cases where the signal intensity is substantially high or substantially low, the following procedure has been performed in conventional systems. A threshold is set to a signal level. Data indicating a signal intensity that does not fall within an ideal range are discarded, and only highly reliable data indicating a signal intensity that falls within the ideal range are outputted (Japanese Laid-open Patent Publication No. 2006-23178).

A device described in Japanese Laid-open Patent Publication No. 2006-23178 is configured to determine a phase value having reliability for each pixel of two-dimensional data. The device is not, however, configured to enable a user to select the reliability.

When a three-dimensional measurement device is used to perform measurement, the intensity of a signal obtained by the measurement changes considerably depending on, for example, gloss, a color, a shape of the surface of an object to be measured. It is, therefore, difficult to set a threshold level suitable for all the conditions. As a result, in some cases, data having no reliability are outputted or necessary data are not outputted.

SUMMARY

The present disclosure is directed to solve the problems pointed out above, and therefore, an object of an embodiment of the present invention is to obtain optimum three-dimensional data easily by enabling a user to confirm, in real time, three-dimensional data obtained by, for example, a three-dimensional measurement device while adjusting a range of reliability of the three-dimensional data.

According to one aspect of the present invention, a method is provided for controlling display of three-dimensional data in a three-dimensional processor that processes three-dimensional data indicating three-dimensional position coordinates of each point on a surface of an object to be measured, the three-dimensional data being obtained by projecting measurement light onto the object and receiving measurement light reflected from the object. The method includes obtaining reliability data that are an index of reliability of three-dimensional data of said each point, enabling a user to adjust a threshold for defining a range of the reliability, and displaying, on a screen of a display, three-dimensional data corresponding to reliability falling within a range defined by the threshold adjusted by the user with the three-dimensional data displayed distinguishably from different three-dimensional data.

Preferably, when a plurality of pieces of three-dimensional data obtained as a result of measurement performed on different surfaces of the object is displayed concurrently on an identical screen, with respect to each of the plurality of pieces of three-dimensional data, only three-dimensional data corresponding to the reliability falling within the range defined by the threshold adjusted by the user may be displayed.

Further, the reliability data may be signal intensity upon receiving the measurement light reflected from the object.

Further, the reliability data may be an approximation error occurring when luminance distribution in a line column signal based on a signal upon receiving the measurement light reflected from the object is approximated to a Gaussian function.

Further, the reliability data may be a slope, with respect to the measurement light, of a surface formed based on the three-dimensional data.

Preferably, a slider may be displayed on the screen, and the slider may be operated by the user thereby to adjust the threshold.

These and other characteristics and objects of the present invention will become more apparent by the following descriptions of preferred embodiments with reference to drawings.

BRIEF DESCRIPTION OF THE DRAWINGS

FIGS. 4A and 4B are diagrams illustrating the principle of measurement of an object to be measured performed by a three-dimensional measurement device.

FIG. 16 is a diagram illustrating sliders displayed on a display screen.

DESCRIPTION OF THE PREFERRED EMBODIMENTS

First Embodiment

Figure 1:
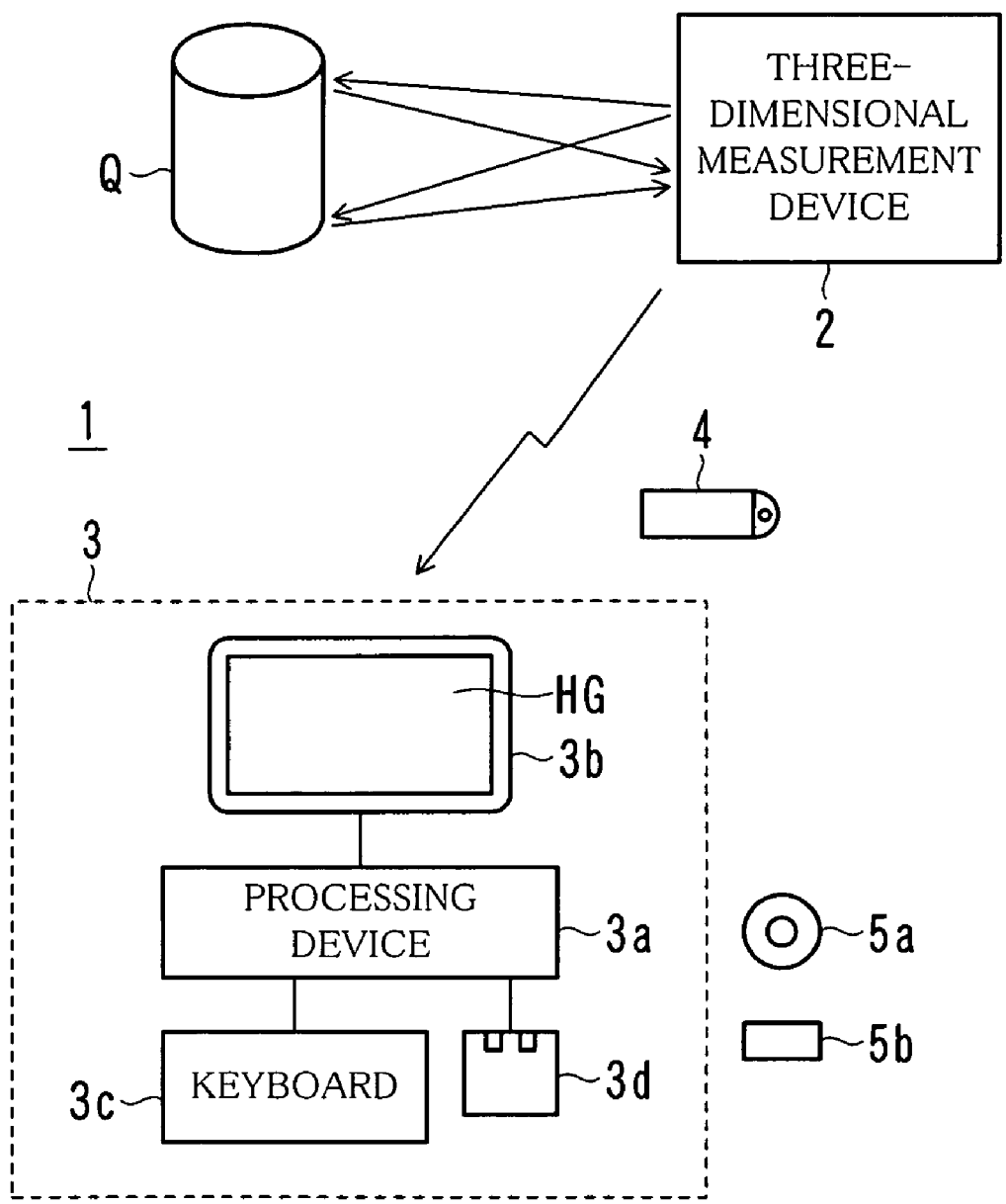
FIG. 1 is a diagram illustrating an example of the configuration of a three-dimensional measurement system according to a first embodiment.
Figure 2:
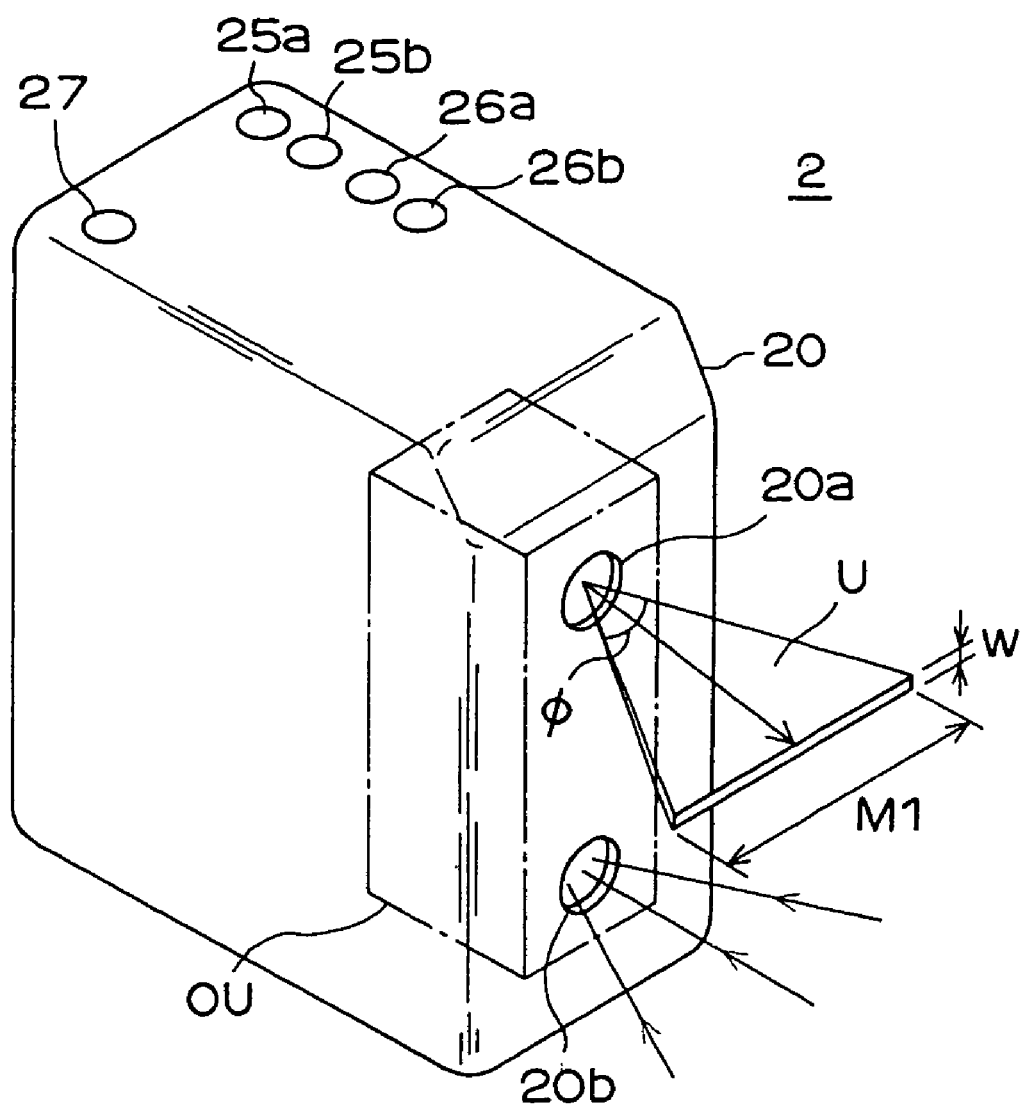
FIG. 2 is a diagram illustrating the appearance of a three-dimensional measurement device.
Figure 3:
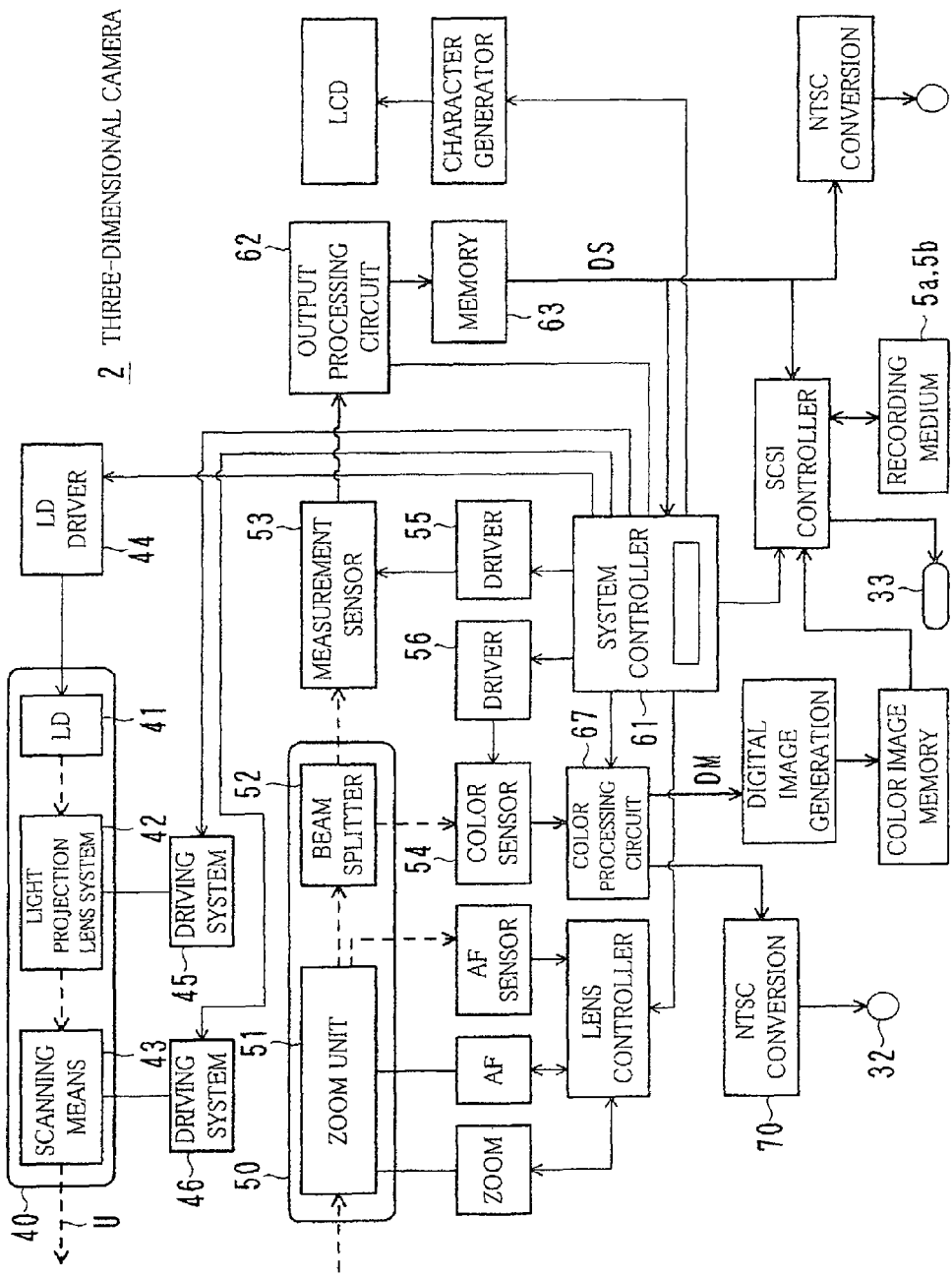
FIG. 3 is a block diagram illustrating an example of the functional configuration of a three-dimensional measurement device.
Figure 5A:
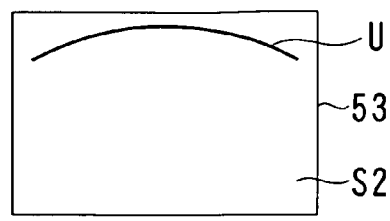
FIGS. 5A to 5E are diagrams illustrating an example of change of slit light that is incident on an imaging surface of a sensor.
Figure 5B:
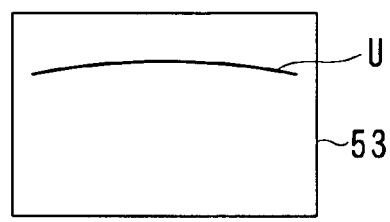
Figure 5C:
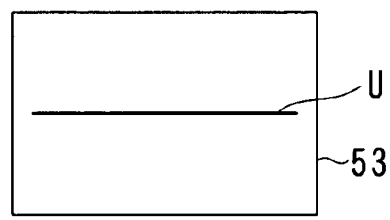
Figure 5D:
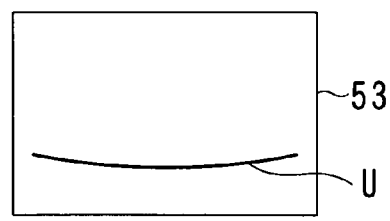
Figure 5E:
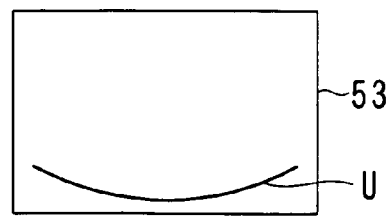

FIG. 1 is a diagram illustrating an example of the configuration of a three-dimensional measurement system 1 according to the first embodiment, FIG. 2 is a diagram illustrating the appearance of a three-dimensional measurement device 2, FIG. 3 is a block diagram illustrating an example of the functional configuration of the three-dimensional measurement device 2, and FIGS. 4A and 4B are diagrams illustrating the principle of measurement of an object Q to be measured performed by the three-dimensional measurement device 2.

Referring to FIG. 1, the three-dimensional measurement system 1 includes the three-dimensional measurement device 2 and a host computer 3.

The three-dimensional measurement device 2 performs three-dimensional measurement on an object to be measured (a target object) using a slit light projection method. The three-dimensional measurement device 2 is sometimes called a three-dimensional measuring device or a three-dimensional camera. The three-dimensional measurement device 2 performs three-dimensional measurement thereby to output, to the host computer 3, data obtained by performing AD conversion on a signal received by a measurement sensor, e.g., a CCD. Hereinafter, such data are sometimes referred to as "raw measurement data". Further, the three-dimensional measurement device 2 is configured to perform an operation for three-dimensional processing based on the raw measurement data and to output three-dimensional data indicating three-dimensional position coordinates of each point on the surface of the object.

The host computer 3 includes a processing device 3a, a display 3b, a keyboard 3c, and a mouse 3d. The processing device 3a includes a CPU, a memory necessary for an operation process, a hard disk, an interface, and a variety of other peripheral devices. A program and data for processing measurement data and three-dimensional data are incorporated into the processing device 3a. Such a program can be installed from a CD-ROM, a DVD-ROM, a semiconductor memory, and other portable recording media 5a and 5b on each of which the program is recorded. Alternatively, the program can be downloaded from a server via a network.

Measurement data obtained by the three-dimensional measurement device 2 can be delivered to the processing device 3a, for example, by way of a portable delivery device 4, connecting thereto through a cable, connecting thereto through a network such as the Internet or a LAN, or connecting thereto through wireless connection.

Referring to FIG. 2, the three-dimensional measurement device 2 includes a housing 20 that has, on its front face, a light-projection window 20a and a light-receiving window 20b. An optical unit OU accommodated in the housing 20 emits slit light U, which passes through the light-projection window 20a toward an object Q to be measured. As shown in FIG. 2, the slit light has a width w. An emission angle Φ of the slit light U in the length direction M1 thereof is a fixed angle. The slit light U reflected from the surface of the object Q partially passes through the light-receiving window 20b and enters the optical unit OU.

The housing 20 has, on its upper face, zooming buttons 25a and 25b, manual focusing buttons 26a and 26b, and a start/stop button 27. The housing 20 has, on its rear face, a liquid crystal display, a cursor button, an analog output terminal, and a digital output terminal. Measurement data and two-dimensional image data are output from the digital output terminal and the analog output terminal, respectively.

Referring to FIG. 3, the three-dimensional measurement device 2 includes two optical systems 40 and 50 on the light-projection side and the light receiving-side, respectively, both of which constitute the optical unit OU. In the optical system 40, a laser beam having a wavelength of 670 nm emitted by a semiconductor laser (LD) 41 passes through a light projection lens system 42, which makes the laser beam be slit light U, and the slit light U is deflected by a galvano mirror 43. A system controller 61 controls a driver 44 for the semiconductor laser 41, a driving system 45 for the light projection lens system 42, and a driving system 46 for the galvano mirror 43.

In the optical system 50, light collected by a zoom unit 51 is divided by a beam splitter 52. Light having a wavelength falling within an oscillation wavelength range of the semiconductor laser 41 enters a sensor 53 for measurement. Light having a wavelength falling within a visible range enters a color sensor 54 for monitor. Each of the sensor 53 and the color sensor 54 is a CCD area sensor.

Imaging information in the sensor 53 is transmitted to an output processing circuit 62 in synchronization with a clock outputted from a driver 55. The output from the sensor 53 undergoes AD conversion performed by the output processing circuit 62 and the resultant is stored in a memory 63 as raw measurement data DS. Thereafter, the raw measurement data DS are read out from the memory 63, and are sent to the host computer 3 via a digital output terminal 33.

Imaging information in the color sensor 54 is transmitted to a color processing circuit 67 in synchronization with a clock outputted from a driver 56. Imaging information subjected to color processing performed by the color processing circuit 67, or in other words, a two-dimensional image DM is outputted online via a NTSC conversion circuit 70 and an analogue output terminal 32. Digital data of the two-dimensional image DM are outputted from the digital output terminal 33.

The digital output terminal 33 also outputs, to the host computer 3, parameters used for an operation for three-dimensional processing and parameters necessary for combining a plurality of pieces of three-dimensional data obtained by image pickup of an object to be measured a plurality of times.

Referring to FIGS. 4A and 4B, the object Q is irradiated with slit light U having a relatively large width corresponding to a plurality of pixels arranged in the vertical direction on an imaging surface S2 of the sensor 53. The slit light U has a width corresponding to, for example, five pixels, although the width of the slit light U depends on a distance between the three-dimensional measurement device 2 and the object Q. Signals of all the pixels on the imaging surface S2 may be introduced for one-time sampling. Alternatively, only signals of thirty-two pixels arranged in the vertical direction corresponding to the width of the slit light U may be introduced without taking into account a part to which no slit light U is applied.

The slit light U is so deflected vertically that the slit light U moves by one pixel pitch pv on the imaging surface S2 every sampling period thereby to scan the surface of the object Q. The sensor 53 outputs a photoelectric conversion signal for one field (one frame) every sampling period (per sampling).

The irradiation direction of the slit light U (angle θ) is obtained based on the irradiation start direction and the deflection angular velocity. A light-receiving amount of the sensor 53 depends on the reflectance of the object Q. Note that a plot showing a light receiving amount vs. time relationship is shown in FIG. 4B.

The following is a description of specific operation details of the case where the three-dimensional measurement device 2 performs measurement on an object Q to be measured having a cylindrical shape, the host computer 3 performs data processing, and the display 3b displays the resultant.

Figure 6A:
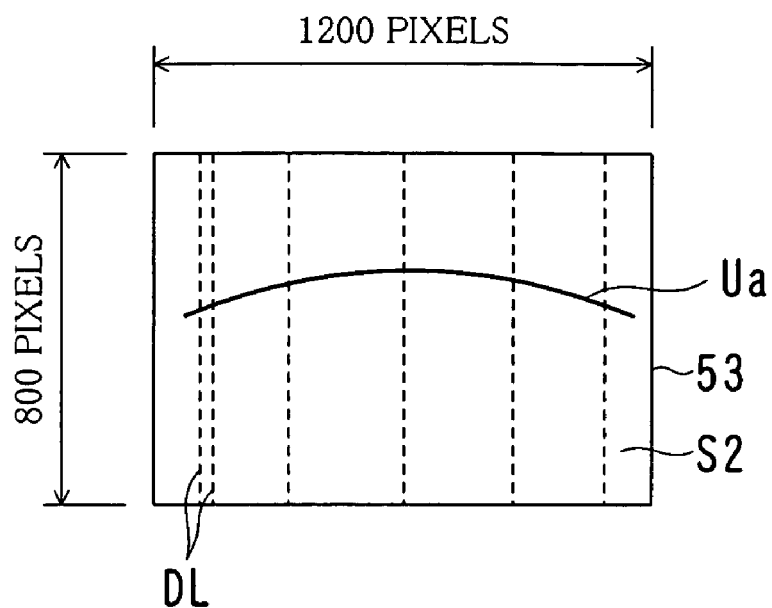
FIGS. 6A and 6B are diagrams illustrating an example of the relationship between slit light incident on an imaging surface and luminance distribution in the vertical line.
Figure 6B:
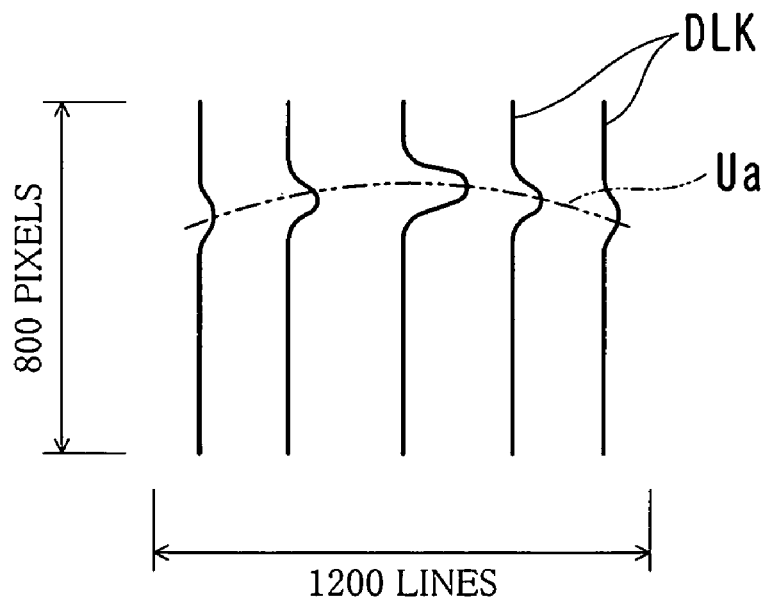
Figure 7:
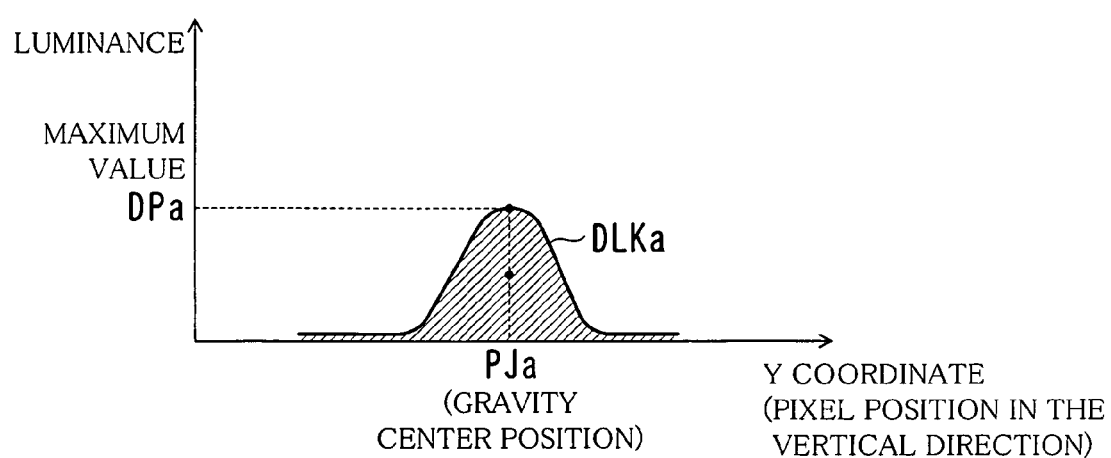
FIG. 7 is an explanatory diagram of a position of a center of gravity in luminance distribution.

FIGS. 5A to 5E are diagrams illustrating an example of change of the slit light U that is incident on the imaging surface S2 of the sensor 53 of the three-dimensional measurement device 2, FIGS. 6A and 6B are diagrams illustrating an example of the relationship between the slit light U incident on the imaging surface S2 and luminance distribution in the vertical line, and FIG. 7 is an explanatory diagram of a position of a center of gravity in luminance distribution.

FIGS. 5A to 5E, in the order named, show that when the slit light U scans the object Q from an upper part to a lower part thereof, the slit light U moves on the imaging surface S2 of the sensor 53. While the slit light U scans the object Q one time, sampling is performed on the sensor 53 plural times. In this embodiment, it is assumed that sampling is performed one thousand times for each image pickup and signals or data for one thousand fields are obtained, although FIGS. 5A to 5E show the case in which sampling is performed five times.

As shown in FIGS. 5A to 5E, the slit light U applied to an upper part of the object Q is curved to be convex upward and the slit light U applied to a lower part of the object Q is curved to be convex downward because the object Q has a cylindrical surface. However, the actual directions of the curves are opposite to the illustrated examples due to the lens.

FIG. 6A shows slit light Ua sampled at certain timing. Pixels where the slit light Ua has entered output signals having intensity corresponding to light intensity (luminance) on the respective pixels. The signals outputted by the pixels undergo AD conversion later, thereby resulting in, for example, 12-bit data, or in other words, luminance data having 4064 gradation levels. Therefore, for example, luminance data of a pixel on which no light has entered-indicate "zero" and luminance data of a pixel on which light with saturated intensity has entered indicate "4063".

In the case where the sensor 53 has the imaging surface S2 with a size corresponding to 800 pixels long (vertically) and 1200 pixels wide (horizontally), signals for a total of 96 thousand (800×1200) pixels are output. Here, among signals for all the pixels, signals with respect to a vertical line made up of 800 pixels arranged vertically are defined as a line column signal DL. The line column signal DL is a set of signals for 800 pixels, and 1200 line column signals DL are obtained through one-time sampling (in one field).

Each of the line column signals DL results in, at a part where the slit light U has entered, a signal or data with a size corresponding to the intensity of the slit light U. Luminance distribution (light intensity distribution) of the line column signals DL corresponding to the slit light Ua shown in FIG. 6A is as illustrated in FIG. 6B.

FIG. 6B shows luminance distribution DLK for each of the line column signals DL. Although one filed has 1200 luminance distribution DLK whose amount is the same as the number of line column signals DL, FIG. 6B illustrates only five out of 1200 luminance distribution DLK.

Referring to each of the luminance distribution DLK, the luminance increases corresponding to the position of the slit light U. Since the object Q has a cylindrical surface, the center of the object Q in the horizontal direction faces toward the three-dimensional measurement device 2, but end portions of the object Q do not face theretoward and face diagonally. Therefore, the maximum luminance of a line column signal DL at the center of line column signals DL in the horizontal direction has the highest value, and the maximum luminance of the line column signals DL is lower as the line column signals DL are away from the center.

FIG. 7 shows a gravity center position PJa and a maximum value DPa in luminance distribution DLKa. A gravity center position PJ specifies a pixel, in each of the line column signals DL, corresponding to the center position of the slit light U. Stated differently, a set of gravity center positions PJ obtained from line column signals DL in one field shows the accurate position of the slit light U in the field.

In FIG. 7, the gravity center position PJa can be obtained by determining a gravity center position of an area of luminance distribution DLK and determining a Y coordinate of the gravity center position, i.e., a pixel position in the vertical direction. Upon the determination of the gravity center position of the area of the luminance distribution DLK, only a part for which luminance of the slit light U is obtained may be used as the range. Accordingly, for a pixel on which no slit light U enters, the signal level thereof is cut as a slice level.

The maximum value Dpa is data indicating the maximum luminance in the luminance distribution DLKa. However, the maximum value DP may be luminance having the maximum level among luminance of each pixel included in the luminance distribution DLKa. Alternatively, the maximum value DPa may be determined by interpolation based on luminance of pixels having higher luminance levels.

In this way, a set of gravity center positions PJ and maximum values DP for 1000 fields is determined.

It should be noted that the gravity center position PJ does not necessarily specify a real pixel. More specifically, temporal interpolation or spatial interpolation is performed; thereby, an intermediate position between two real pixels can be used as the gravity center position PJ. Thus, the gravity center position PJ can be specified with resolution higher than actual resolution of the sensor 53.

Figure 8:
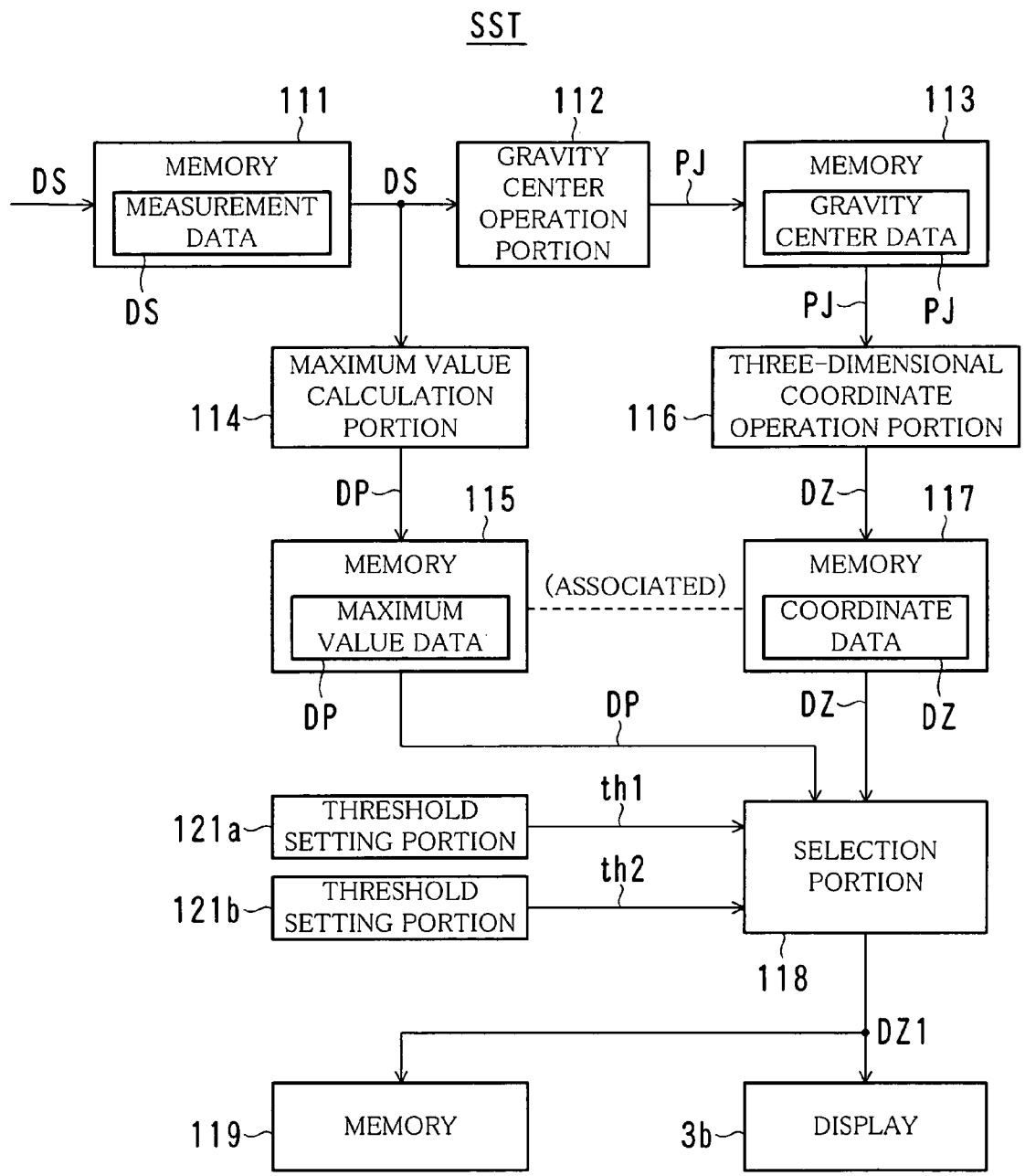
FIG. 8 is a block diagram illustrating an example of the functional configuration of a three-dimensional processor.
Figure 9A:
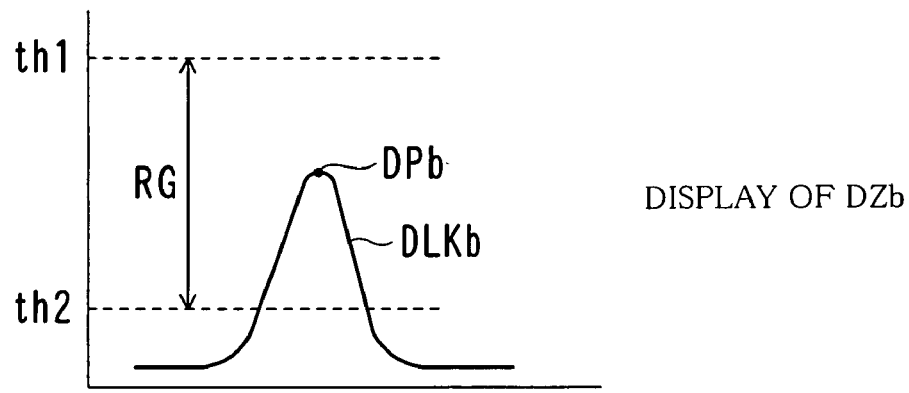
FIGS. 9A to 9C are diagrams illustrating that a range of the maximum value is selected based on thresholds.
Figure 9B:
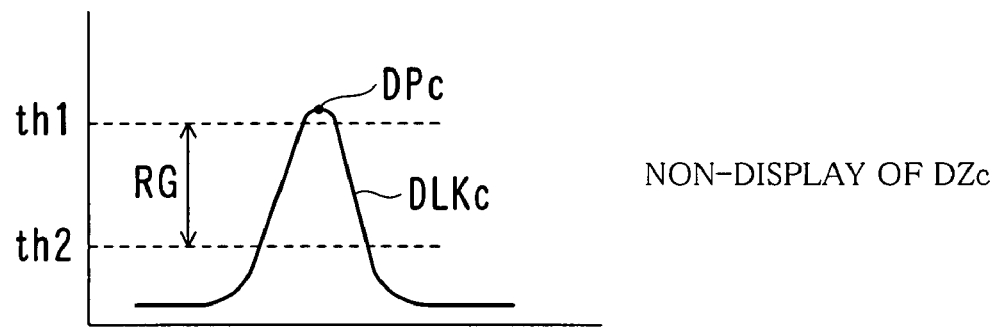
Figure 9C:
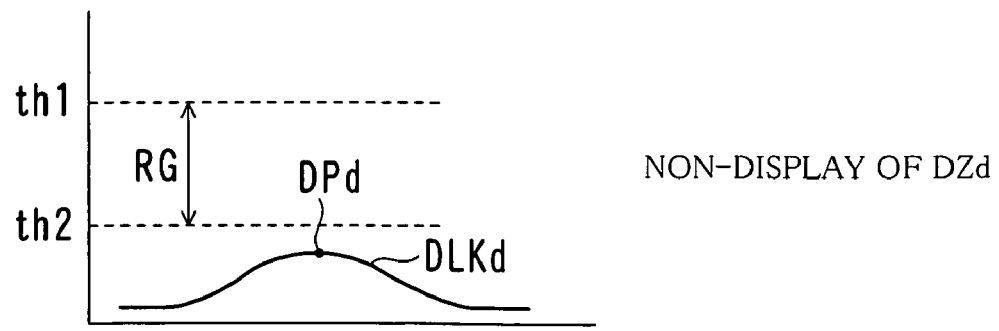
Figure 10A:
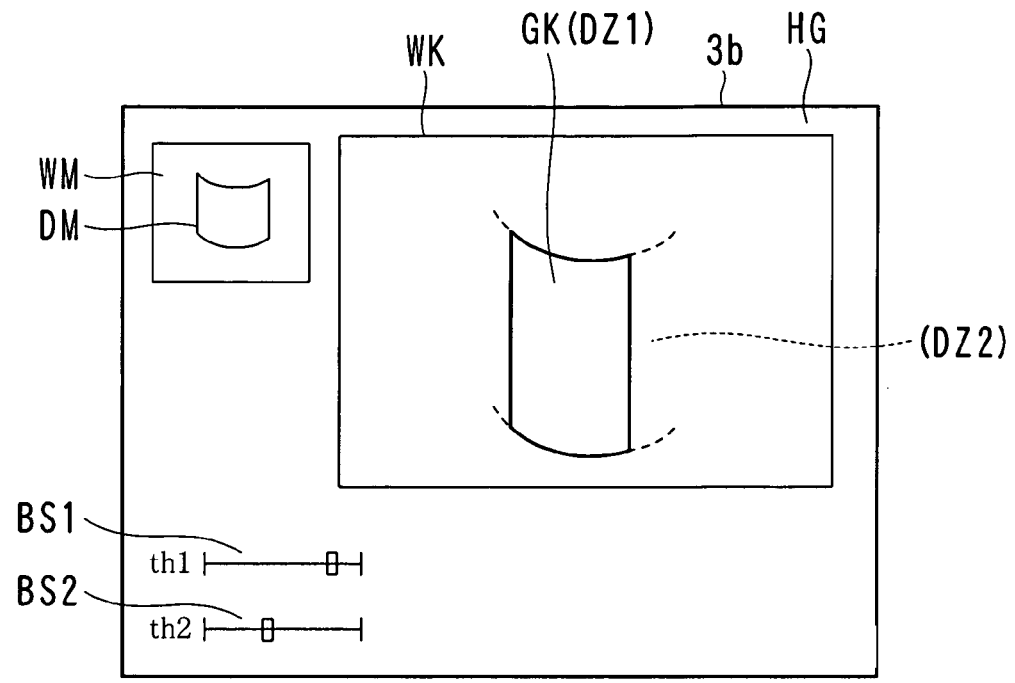
FIGS. 10A and 10B are diagrams illustrating an example of display details on a display.
Figure 10B:
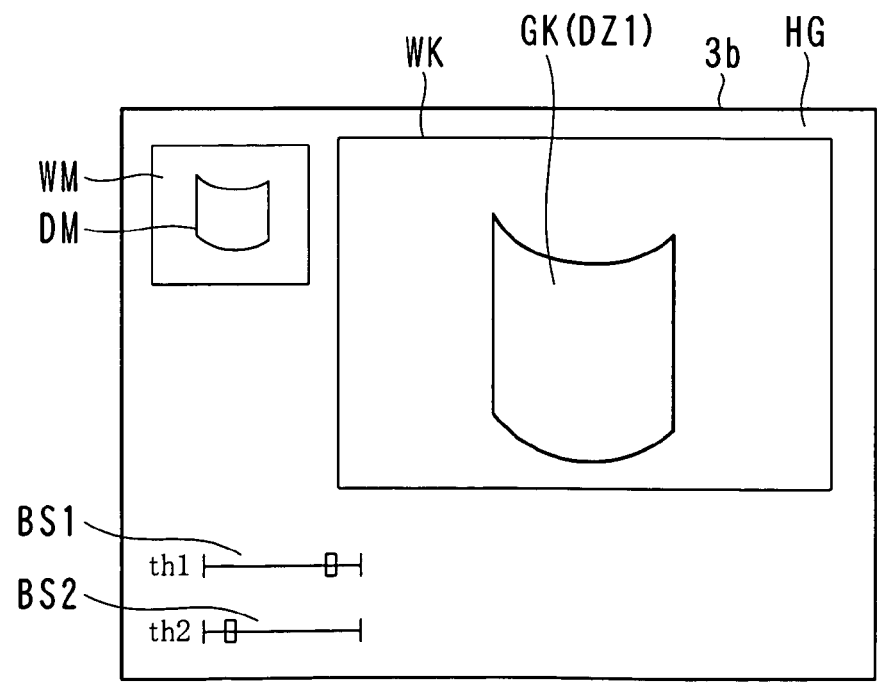
Figure 11A:
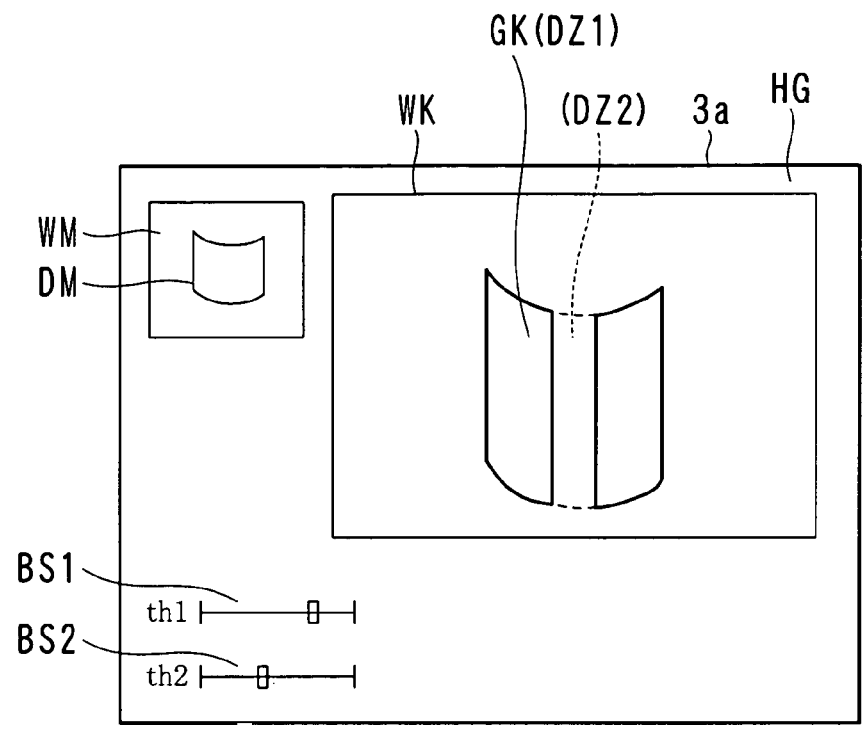
FIGS. 11A and 11B are diagrams illustrating an example of display details on a display.
Figure 11B:
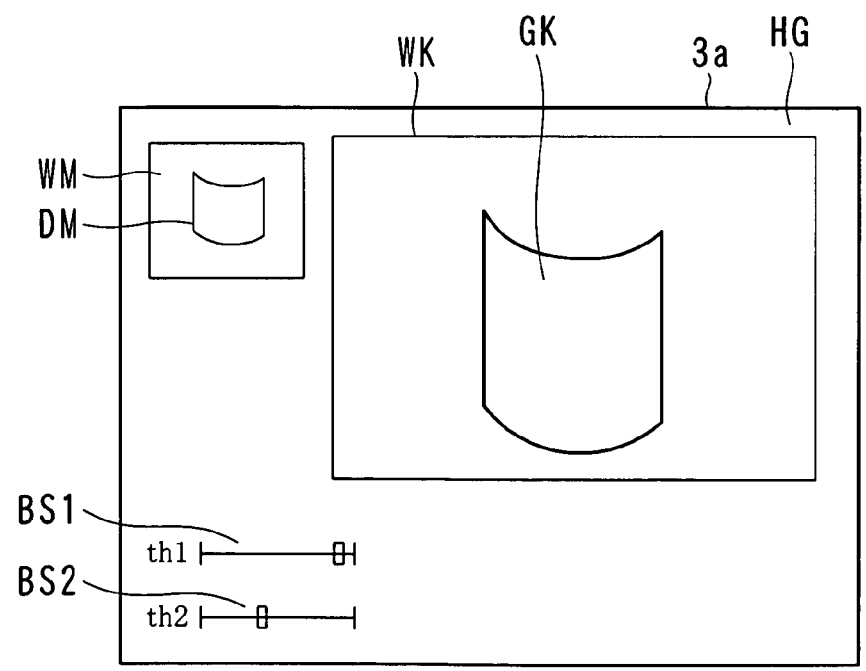
Figure 12:
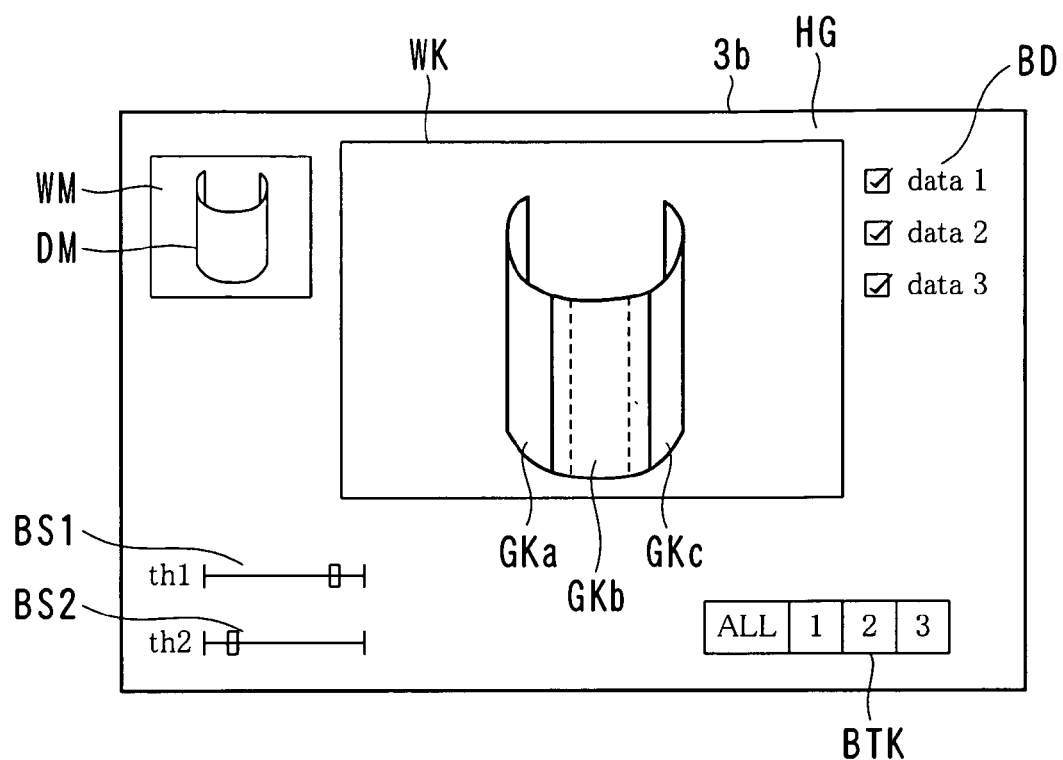
FIG. 12 is a diagram illustrating an example of display details when a plurality of distance images is displayed at the same time.
Figure 13:
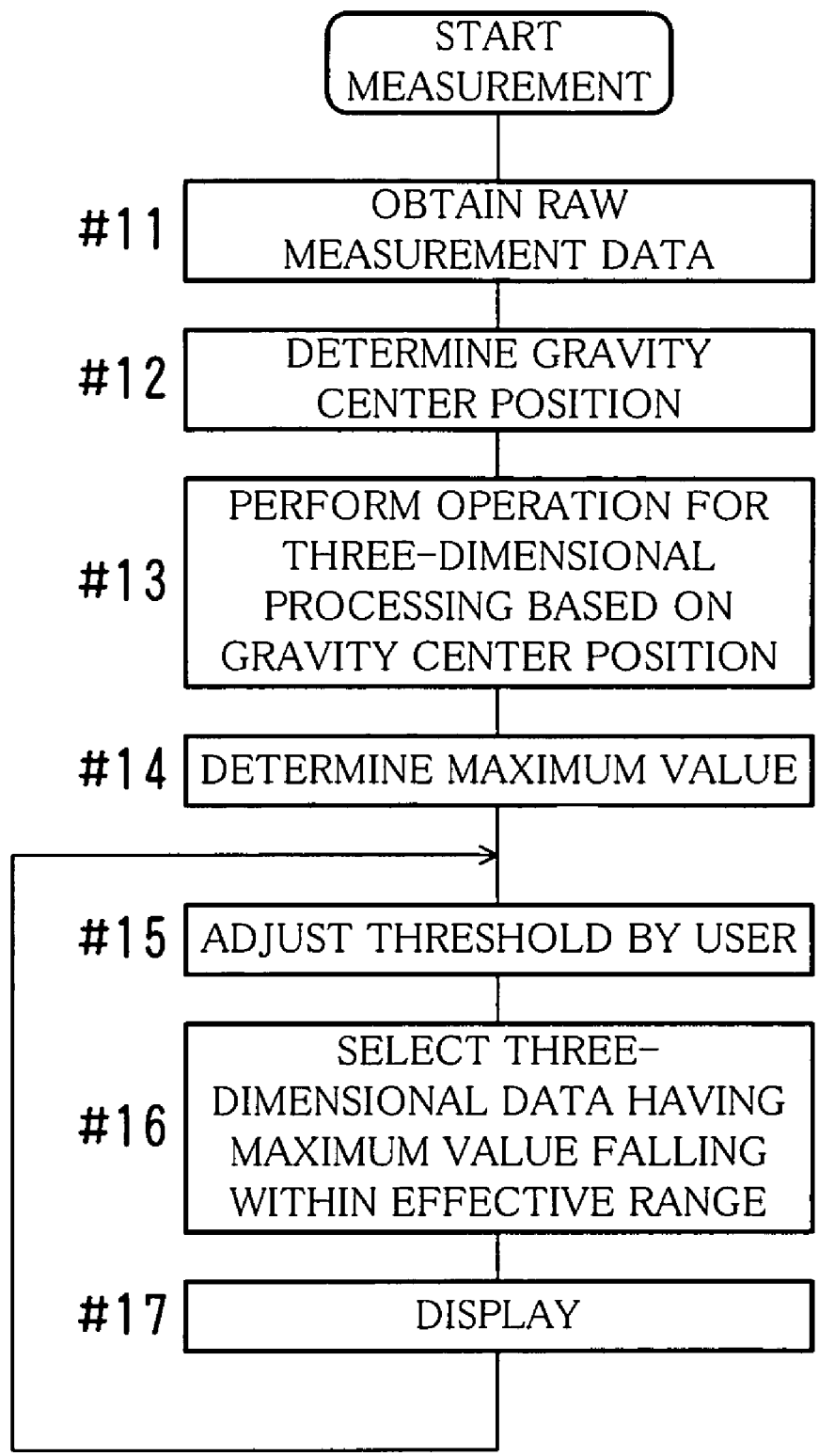
FIG. 13 is a flowchart illustrating an example of the flow of three-dimensional processing.

FIG. 8 is a block diagram illustrating an example of the functional configuration of a three-dimensional processor SST realized by the host computer 3, FIGS. 9A to 9C are diagrams illustrating that a range RG of the maximum value DP is selected based on thresholds th1 and th2, FIGS. 10A, 10B, 11A, and 11B are diagrams illustrating examples of display details on a display screen HG of the display 3b, FIG. 12 is a diagram illustrating an example of display details of the display screen HG when a plurality of distance images GK is displayed at the same time, and FIG. 13 is a flowchart illustrating an example of the flow of three-dimensional processing.

Referring to FIG. 8, the three-dimensional processor SST includes a memory 111, a gravity center operation portion 112, a memory 113, a maximum value calculation portion 114, a memory 115, a three-dimensional coordinate operation portion 116, a memory 117, a selection portion 118, and threshold setting portions 121a and 121b.

Raw measurement data DS outputted from the three-dimensional measurement device 2 are stored in the memory 111. The raw measurement data DS are a set of data in 1000 fields for one-time image pickup. Data for each field may be luminance data for 96 thousand pixels or may be luminance data (luminance distribution DLK) for 1200 line column signals DL. Further, in the case where only signals of thirty-two pixels corresponding to the width of the slit light U are introduced, the data amount is determined accordingly.

For the measurement data DS stored in the memory 111, the gravity center operation portion 112 performs an operation to determine a gravity center position PJ in each luminance distribution DLK. The gravity center position PJ thus determined is stored in the memory 113.

The three-dimensional coordinate operation portion 116 performs an operation for three-dimensional processing based on the gravity center position PJ obtained from the measurement data DS for one-time image pickup; thereby to determine coordinate data DZ indicating three-dimensional position coordinates of each point on the surface of the object Q. The coordinate data DZ thus determined are stored in the memory 117. The coordinate data DZ are sometimes referred to as three-dimensional data, three-dimensional coordinate data, or distance data.

For the measurement data DS stored in the memory 111, the maximum value calculation portion 114 determines the maximum value DP in each luminance distribution DLK. The maximum value DP thus determined is stored in the memory 115.

The gravity center position PJ, the coordinate data DZ, and the maximum data DP are stored together with the respective attributes each of which indicating what it is about.

Each of the maximum values DP for one-time image pickup and each piece of the coordinate data DZ are in one-to-one correspondence. Stated differently, the maximum value DP is associated with each piece of the coordinate data DZ. The maximum value DP associated with each piece of the coordinate data DZ corresponds to reliability data used as the index of reliability of each piece of the coordinate data DZ.

The selection portion 118 selects only coordinate data DZ corresponding to a maximum value DP falling within a predetermined range RG from among coordinate data DZ inputted for each image pickup, and outputs the coordinate data DZ thus selected to the display 3b. The predetermined range RG is determined by the threshold setting portions 121a and 121b.

More specifically, the threshold setting portions 121a and 121b determine an upper limit threshold th1 in the range RG and a lower limit threshold th2 in the range RG, respectively. The selection portion 118 selects only coordinate data DZ corresponding to a maximum value DP falling within the range RG defined by the threshold th1 and the threshold th2. The coordinate data DZ thus selected are outputted to the display 3b or stored in the memory 119.

Thus, of measurement data DS obtained by receiving light with the sensor 53, measurement data DS in which light intensity is substantially high and measurement data DS in which light intensity is substantially low are removed. As a result, the selection portion 118 selects coordinate data DZ having high reliability based only on measurement data DS having light intensity falling within the predetermined range RG.

Referring to FIG. 9A, a maximum value DPb of luminance distribution DLKb falls within a range RG defined by thresholds th1 and th2. Accordingly, coordinate data DZb corresponding to the maximum value DPb passes through the selection portion 118, so that the coordinate data DZb are displayed on the display screen HG of the display 3b.

Referring to FIG. 9B, a maximum value DPc of luminance distribution DLKc exceeds a threshold th1, or in other word, does not fall within a range RG. Accordingly, coordinate data DZc corresponding to the maximum value DPc do not pass through the selection portion 118, so that the coordinate data DZc are not displayed on the display screen HG of the display 3b.

Referring to FIG. 9C, a maximum value DPd of luminance distribution DLKd is smaller than a threshold th2, or in other words, does not fall within a range RG. Accordingly, coordinate data DZd corresponding to the maximum value DPd do not pass through the selection portion 118, so that the coordinate data DZd are not displayed on the display screen HG of the display 3b.

Referring to FIG. 10A, the display screen HG of the display 3b is provided with a window WK for three-dimensional display and a window WM for two-dimensional display. The window WK displays a distance image GK represented by coordinate data DZ for one-time image pickup. The window WM displays a two-dimensional image DM sent from the three-dimensional measurement device 2. The display screen HG displays sliders BS1 and BS2 for enabling a user to set thresholds th1 and th2, respectively.

Positions appropriately preset by a party that provides a program for the three-dimensional processor SST are used as default values of adjustment positions of the sliders BS1 and BS2, and the preset positions are initially displayed. The default values can be changed by a user.

The distance image GK displayed on the window WK is represented by a set of the coordinate data DZ selected by the selection portion 118. Stated differently, the distance image GK represented only by the coordinate data DZ corresponding to a maximum value DP falling within a range RG defined by thresholds th1 and th2 is displayed on the window WK.

Coordinate data DZ that fall within the range RG and coordinate data DZ that do not fall within the range RG are sometimes referred to as "coordinate data DZ1" and "coordinate data DZ2", respectively.

Coordinate data DZ2 corresponding to a maximum value DP that does not fall within the range RG are not displayed on the window WK. Alternatively, such coordinate data DZ2 are displayed so as to be distinguished from the coordinate data DZ1 corresponding to a maximum value DP that falls within the range RG. Such coordinate data DZ2 are displayed, for example, with the display density or the display color thereof changed.

A user can operate the sliders BS1 and BS2 to change and adjust the thresholds th1 and th2. The user operates the sliders BS by placing the cursor of a mouse on the sliders BS and drags the sliders BS in the left or right direction. When the slider BS2 is operated to lower the threshold th2, the area of the distance image GK to be displayed is increased as shown in FIG. 10B.

More specifically, when the threshold th2 is lowered as shown in FIG. 10B, the window WK displays the distance image GK including an area corresponding to coordinate data DZ2 that is not displayed on the window WK shown in FIG. 10A because the light intensity is low.

Referring to FIG. 11A, a distance image GK lacking in a middle portion thereof is displayed on the window WK. The middle portion is not displayed because the maximum value DP of the light intensity is substantially large. In that case, a user operates the slider BS1 to increase the threshold th1, so that coordinate data DZ corresponding to a large maximum value DP is included. As a result, a distance image GK including the middle portion is displayed as shown in FIG. 11B.

In this way, a user operates the sliders BS to adjust the thresholds th1 and th2. Thereby, a distance image GK represented by coordinate data DZ falling within a range RG defined by the thresholds th1 and th2 thus adjusted is displayed on the window WK in real time. The user can determine the thresholds th1 and th2 appropriately while seeing the distance image GK.

When the range RG is increased, for example, an area of the distance image GK displayed on the window WK is increased accordingly, which causes the area thus increased to include coordinate data DZ with less reliability. For example, the increased area may include noise data or isolated point data. The isolated point data mean coordinate data of an isolated point out of the original surface of an object Q to be measured.

In contrast, when the range RG is reduced, an area of the distance image GK displayed on the window WK is reduced accordingly, which makes the distance image GK be represented only by coordinate data DZ with high reliability. In this case, however, the area of the distance image GK obtained by one-time image pickup is small. Accordingly, if the distance image GK of the entire periphery of the object Q is desired, it takes a significant amount of time to perform measurement on the object Q.

The two-dimensional image DM displayed on the window WM is useful for comparison with the distance image GK.

A user can set desired thresholds th1 and th2 depending on the application of three-dimensional data and obtain optimum coordinate data DZ easily, taking into account, for example, the state of the distance image GK displayed on the window WK and time required for performing measurement on the object Q.

The coordinate data DZ of the distance image GK displayed on the window WK are stored in an appropriate memory by operating, for example, the keyboard 3c or the mouse 3d.

The foregoing is a description of the case where a distance image GK based on measurement data DS obtained by one-time image pickup is displayed on the display screen HG of the display 3b. Instead of that, a plurality of distance images GK based on a plurality of pieces of measurement data DS obtained by plural times of image pickup is concurrently displayed on the same display screen.

More specifically, the three-dimensional measurement device 2 is used to perform measurement on the surface of the entire periphery of an object Q to be measured by plural times of image pickup. Then, distance images GK obtained based on measurement data DS for each time of image pickup can be combined with one another for display. In that case, with respect to each of the plurality of pieces of measurement data DS, only measurement data DS corresponding to a maximum value DP falling within a range RG defined by thresholds th1 and th2 adjusted by a user are displayed. The user can collectively set thresholds th for a plurality of pieces of coordinate data DZ, at the same time, obtained by different image pickup. Alternatively, the user can set those thresholds th individually. The following is a description of an example of such a window WK with reference to FIG. 12.

Referring to FIG. 12, the window WK displays three distance images GKa, GKb, and GKc concurrently with the three distance images aligned with one another. Further, displayed on the display screen HG are buttons BTK used for determining to which of the three distance images GKa, GKb and GKc the adjustment of the thresholds th using the sliders BS is applied.

Four of "all", "1", "2", and "3" modes are displayed as the buttons BTK. A user selects any one of the four modes by using a mouse or the like, thereby to determine a mode.

When the button BTK corresponding to "all" mode is selected, thresholds th1 and th2 for the three distance images GK can be collectively set by operating the sliders BS.

Further, when the button BTK corresponding to any one of the "1", "2", and "3" modes is selected, thresholds th1 and th2 for any one of the distance images GKa, GKb, and GKc can be adjusted accordingly by operating the sliders BS1 and BS2.

Alternatively, a configuration is possible in which sliders BS corresponding to each of the distance images GKa, GKb, and Gkc are displayed to adjust thresholds th1 and th2 therefor individually.

A user operates the sliders BS to adjust thresholds th1 and th2 so that, for example, the three distance images GK are combined with one another appropriately, and further that the portion where the distance images GK are overlapped with each other is minimized.

Whether all of the three distance images GK are concurrently displayed or only any of the three distance images GK are displayed can be selected by checking data selection boxes BD displayed in the upper right of the display screen HG.

The following is a description of the flow of three-dimensional processing with reference to a flowchart.

Referring to FIG. 13, measurement data DS obtained as a result of measurement performed by the three-dimensional measurement device 2 are stored in the memory 111 (#11). A gravity center position PJ is determined for luminance distribution DLK of each line column signal DL (#12). An operation for three-dimensional processing is performed based on the gravity center position PJ to obtain coordinate data DZ (#13). A maximum value DP of the luminance distribution DLK is determined (#14). Only coordinate data DZ having a maximum value DP falling within a range RG set by a user are selected (#15 and #16) and a distance image GK based on the coordinate data DZ thus selected is displayed (#17). When the user changes the range RG, a distance image GK is displayed accordingly (#15-#17).

Second Embodiment

A description of the second embodiment is given below. In the second embodiment, with respect to measurement data DS, an approximation error occurring when luminance distribution DLK in a line column signal DL is approximated to a Gaussian function is determined. Then, the approximation error thus determined is used as reliability data.

The basic configuration and operation of the three-dimensional measurement system 1 according to the second embodiment are the same as those in the first embodiment. Accordingly, the below description focuses on the points that differ from the first embodiment.

Figure 14:
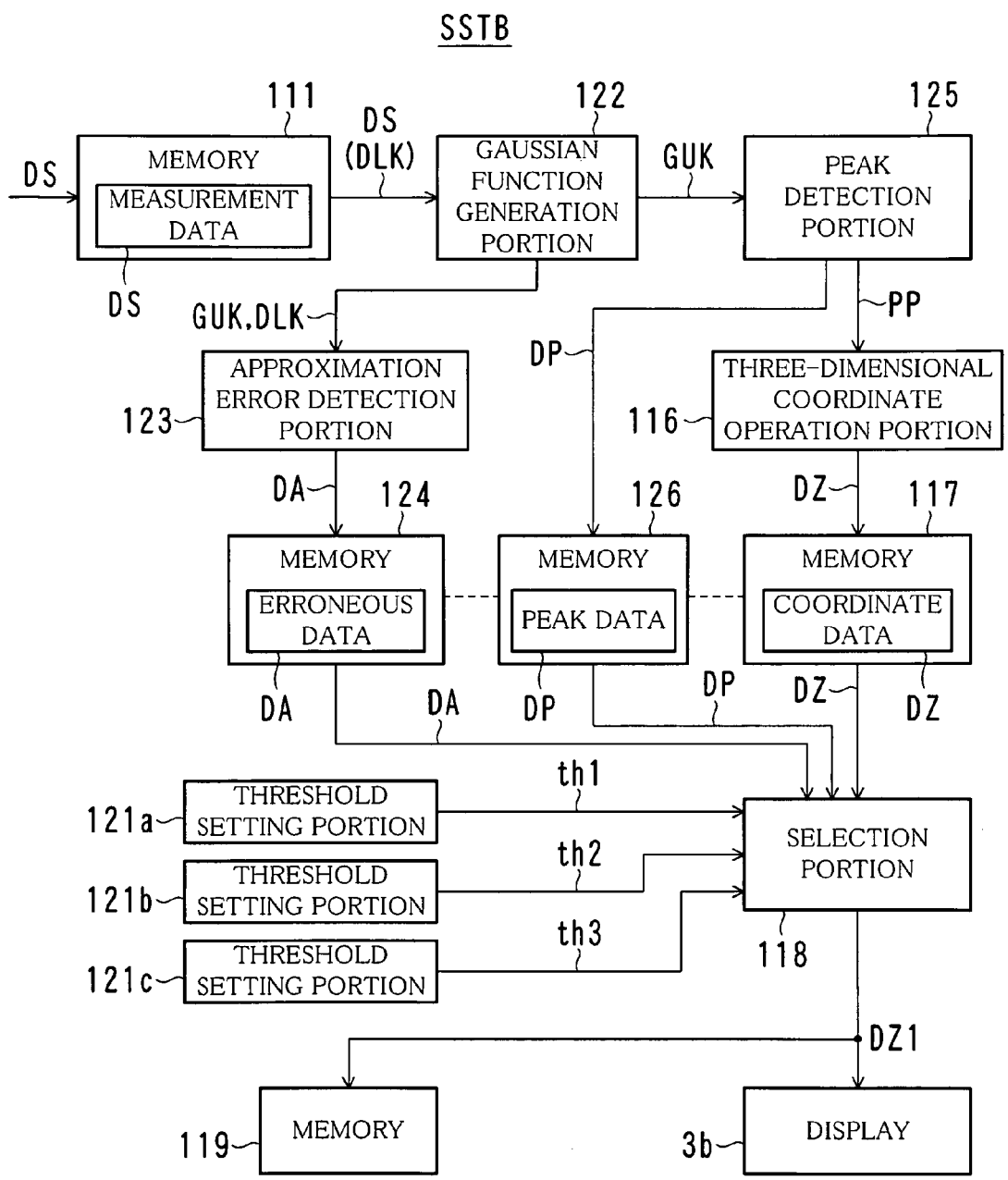
FIG. 14 is a block diagram illustrating an example of the functional configuration of a three-dimensional processor according to a second embodiment.
Figure 15A:
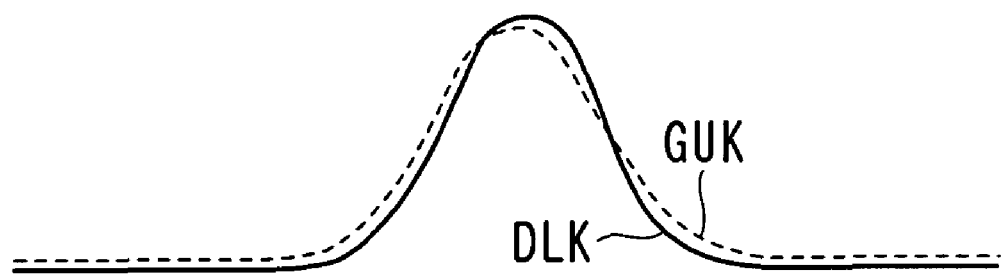
FIGS. 15A and 15B are diagrams illustrating luminance distribution obtained from measurement data and a Gaussian function approximating to the luminance distribution.
Figure 15B:
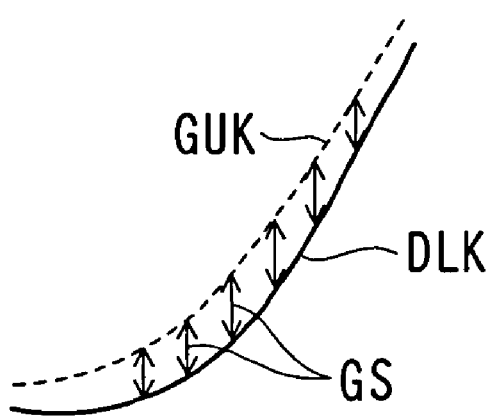
Figure 17:
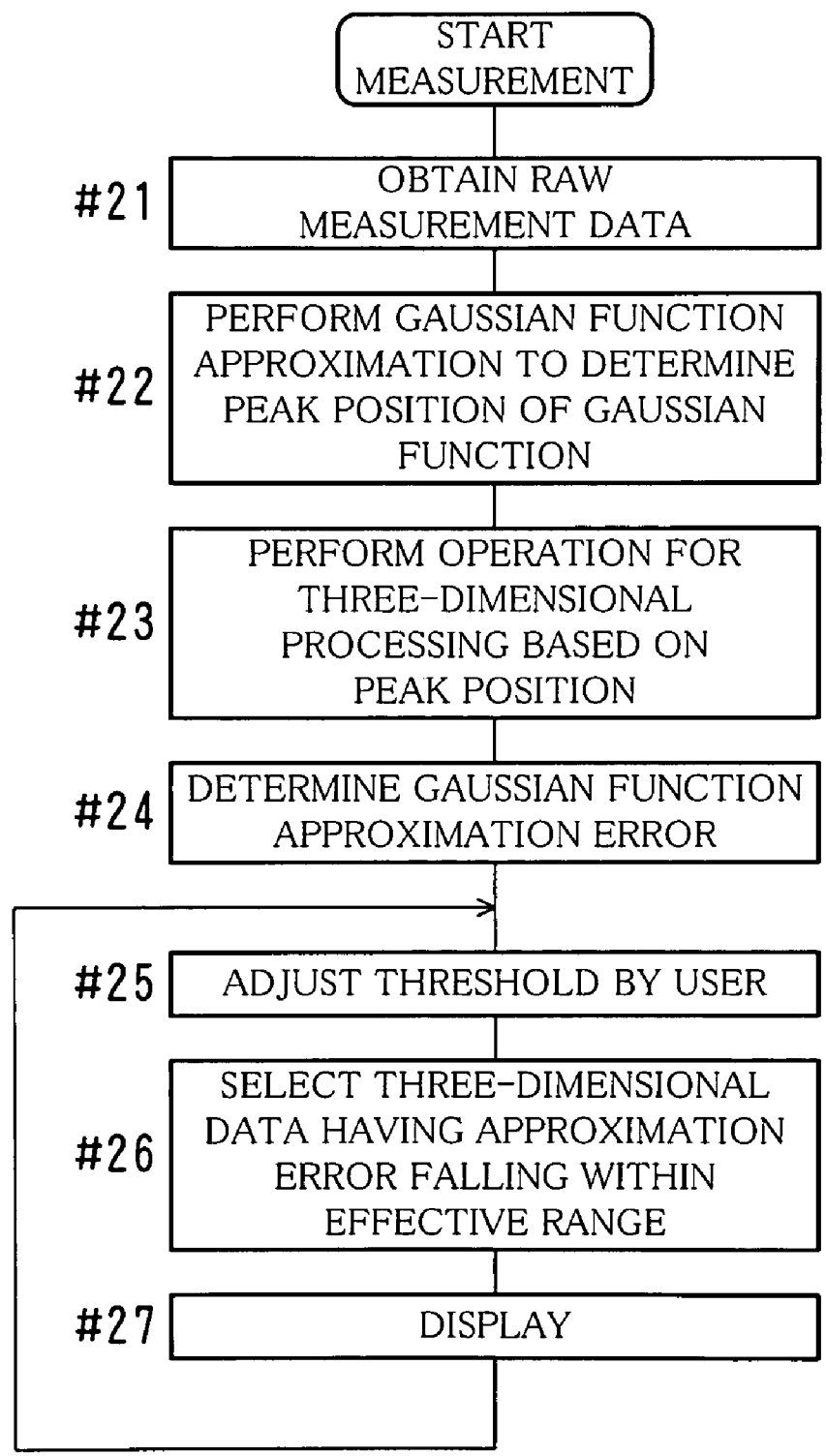
FIG. 17 is a flowchart illustrating an example of the flow of three-dimensional processing according to a second embodiment.

FIG. 14 is a block diagram illustrating an example of the functional configuration of a three-dimensional processor SSTB realized by the host computer 3 according to the second embodiment, FIGS. 15A and 15B are diagrams illustrating luminance distribution DLK obtained from measurement data DS and a Gaussian function approximating to the luminance distribution DLK, FIG. 16 is a diagram illustrating sliders BS1-BS3 displayed on the display screen HG, and FIG. 17 is a flowchart illustrating an example of the flow of three-dimensional processing according to the second embodiment.

Referring to FIG. 14, the three-dimensional processor SSTB includes a Gaussian function generation portion 122, an approximation error detection portion 123, a memory 124 for storing erroneous data DA, a peak detection portion 125, a memory 126 for storing peak data, and a threshold setting portion 121c.

The Gaussian function generation portion 122 generates, with respect to measurement data DS, a Gaussian function GUK approximating to each luminance distribution DLK.

As illustrated in FIG. 15A, a Gaussian function GUK approximating to each luminance distribution DLK is generated. To be more specific, a signal profile of measurement data DS is approximated to determine a Gaussian function GUK. Conventional known methods can be used as a method for determining a Gaussian function GUK.

The approximation error detection portion 123 determines an approximation error in a Gaussian function GUK for each luminance distribution DLK. The approximation error can be determined based on the difference GS between each point of the luminance distribution DLK and each point of the Gaussian function GUK. Upon the use of the difference GS for calculation of the approximation error, only a part for which luminance of slit light U is obtained may be used as the range of the difference GS.

As illustrated in FIG. 15B, differences GS are detected to determine an approximation error based on the differences GS thus detected. For example, the approximation error is determined by the sum of squares of the difference GS. The approximation error thus determined is outputted as erroneous data DA and stored in the memory 124. The erroneous data DA correspond to reliability data.

In the case where slit light U entering the imaging surface S2 of the sensor 53 has sufficient signal intensity, there is little influence of noise, thereby resulting in a small approximation error (erroneous data DA). Conversely, in the case where a signal has low intensity, an approximation error is large due to the influence of noise.

A profile of a Gaussian function GUK is altered in an edge portion of an object Q to be measured due to complicated reflection conditions imposed on slit light U. For this reason, an approximation error is large.

In this embodiment, an approximation error (erroneous data DA) is used as reliability data. Thereby, it is possible for a user to adjust and remove noise data in an edge portion of the shape of the object Q in addition to measurement data or coordinate data DZ having low reliability in signal intensity.

The peak detection portion 125 determines, based on a Gaussian function GUK, a peak value (maximum value) DP thereof and a peak position PP that is the position of the peak value. The three-dimensional coordinate operation portion 116 performs an operation for three-dimensional processing based on the peak position PP obtained from measurement data DS for one-time image pickup; thereby to determine coordinate data DZ specifying three-dimensional position coordinates of each point on the surface of the object Q.

In the first embodiment, the maximum value DP is determined based on luminance distribution DLK. Instead of that, in the second embodiment, the peak value DP is determined based on a Gaussian function GUK. This makes it possible to obtain an accurate peak value DP without performing interpolation between pixels. However, a maximum value DP based on luminance distribution DLK may be used without using such a peak value DP.

Further, in the first embodiment, a gravity center position PJ of luminance distribution DLK is used for performing an operation for three-dimensional processing. Instead of that, in the second embodiment, a peak position PP of a Gaussian function GUK is used. This eliminates the need for an operation of a gravity center position PJ, thereby resulting in simplified operation.

The threshold setting portion 121c is configured to set and adjust a threshold th3 for erroneous data DA. In other words, the selection portion 118 selects only coordinate data DZ having erroneous data DA whose approximation error falls within a range RG between zero and a threshold th3.

Referring to FIG. 16, a slider BS3 for setting and adjusting a threshold th3 is displayed together with other sliders BS1 and BS2. The respective sliders BS1-BS3 are operated to adjust the area of a distance image GK displayed on a window WK.

Selection based on the threshold th3 can be performed independently with selection based on the thresholds th1 and th2 being ineffective. In this case, detecting a peak value DP is unnecessary. Further, selecting a mode enables the threshold th3 to be selected in addition to selection based on the thresholds th1 and th2. In short, it is possible to apply three of the thresholds th1-th3 using an AND operation. In that case, however, detecting a peak value DP is necessary.

Referring to FIG. 17, measurement data DS obtained as a result of measurement using the three-dimensional measurement device 2 are stored in the memory 111 (#21). With respect to luminance distribution DLK for each line column signal DL, a Gaussian function GUK approximating to the luminance distribution DLK is determined and a peak value DP and a peak position PP of the Gaussian function GUK are detected (#22). An operation for three-dimensional processing is performed based on the peak position PP to obtain coordinate data DZ (#23). An approximation error (erroneous data DA) in the Gaussian function GUK is determined (#24). Only coordinate data DZ having erroneous data DA falling within a range RG set by a user are selected (#25 and #26), and a distance image GK based on the coordinate data DZ thus selected is displayed (#27). When the user changes the range RG, a distance image GK is displayed accordingly (#25-#27).

Third Embodiment

A description of the third embodiment is given below. In the third embodiment, for measurement data DS, a slope, with respect to measurement light, of a surface represented based on coordinate data DZ, i.e., an optical axis of the three-dimensional measurement device 2 is determined. Then, the slope thus determined is used as reliability data.

The basic configuration and operation of the three-dimensional measurement system 1 according to the third embodiment are the same as those in the first and second embodiments. Accordingly, the below description focuses on the points that differ from the first and second embodiments.

Figure 18:
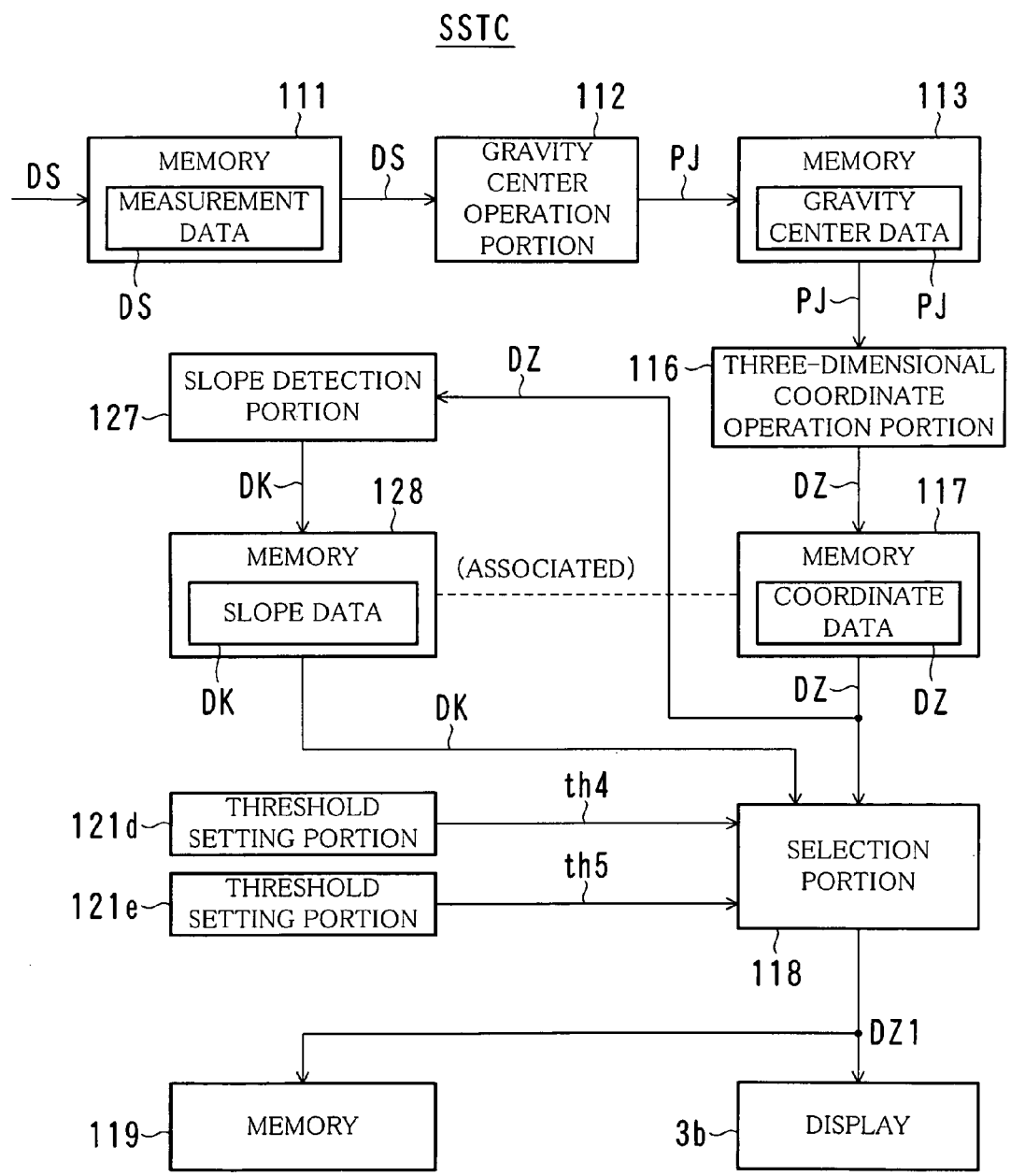
FIG. 18 is a block diagram illustrating an example of the functional configuration of a three-dimensional processor according to a third embodiment.
Figure 19:
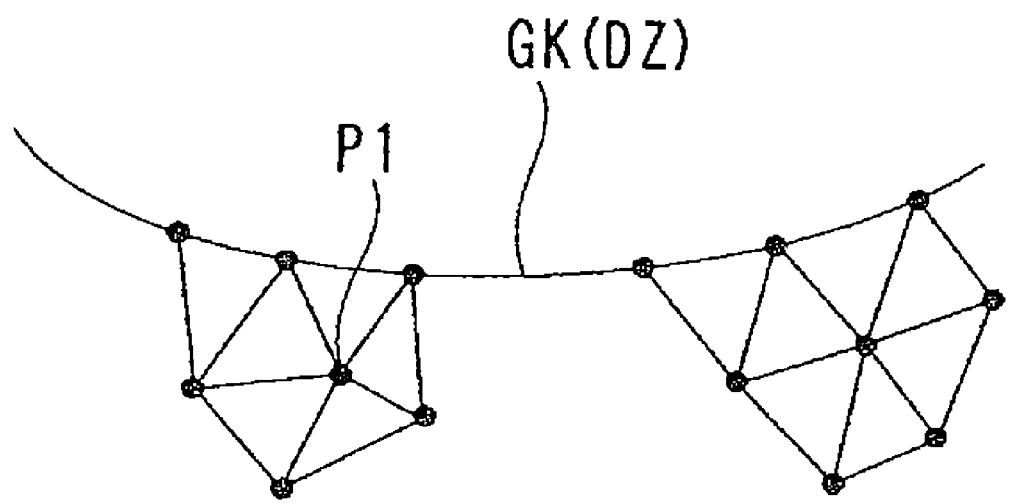
FIG. 19 is a diagram illustrating that slope data are obtained based on coordinate data.
Figure 20:
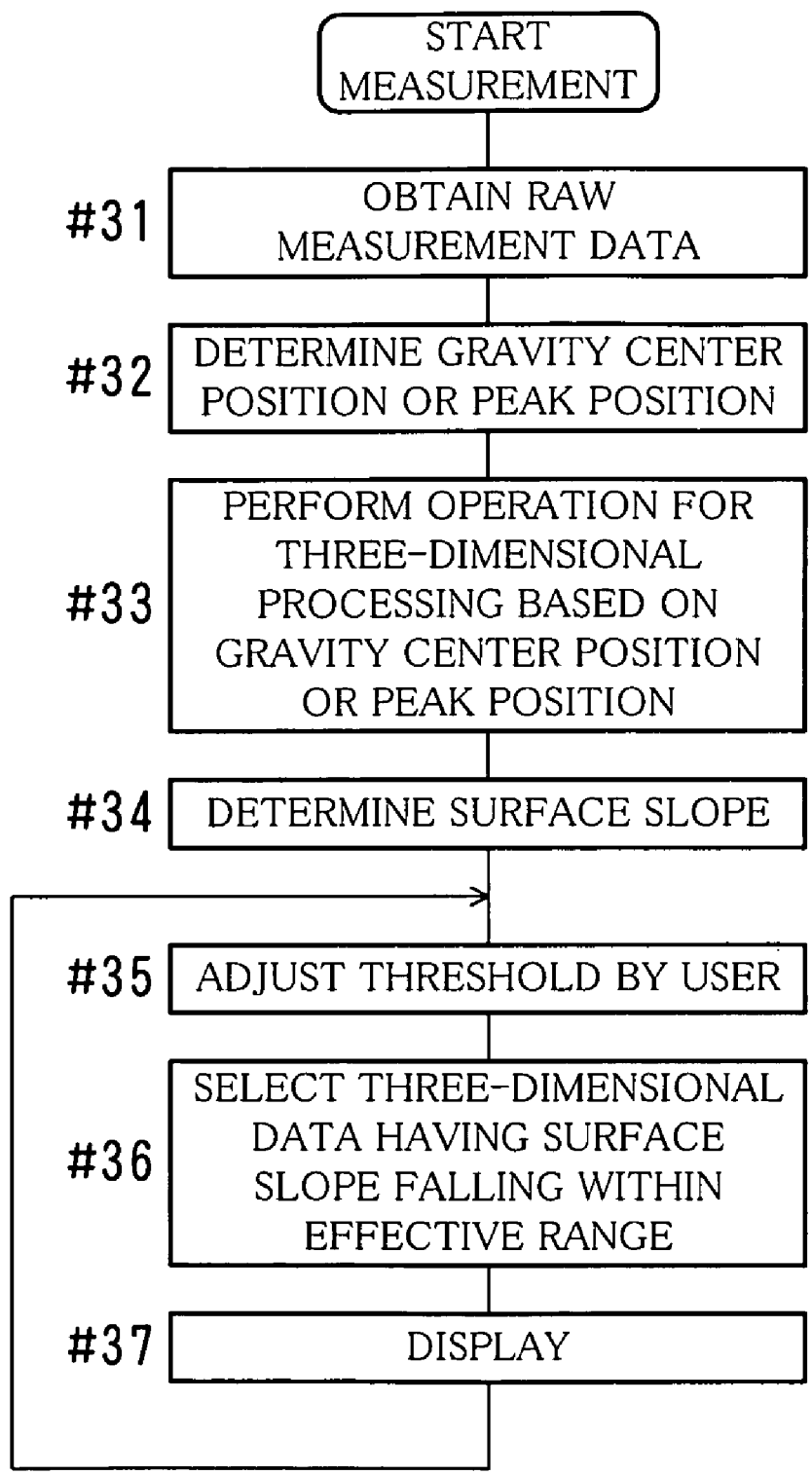
FIG. 20 is a flowchart illustrating an example of the flow of three-dimensional processing according to a third embodiment.

FIG. 18 is a block diagram illustrating an example of the functional configuration of a three-dimensional processor SSTC, realized by the host computer 3, according to the third embodiment, FIG. 19 is a diagram illustrating that slope data DK are detected based on coordinate data DZ, and FIG. 20 is a flowchart illustrating an example of the flow of three-dimensional processing according to the third embodiment.

Referring to FIG. 18, the three-dimensional processor SSTC includes a slope detection portion 127, a memory 128 for storing slope data DK, a threshold setting portion 121d, and another threshold setting portion 121e.

The slope detection portion 127 uses coordinate data DZ to detect a slope of the coordinate data DZ. The slope is determined as, for example, an angle. The slope is determined, for example, with respect to coordinate data DZ of a target point, based on coordinate data DZ of a plurality of points around the target point.

For example, a surface is formed using nine points around a target point. A normal line of the surface is determined and a slope is determined based on the normal line.

As illustrated in FIG. 19, based on coordinate data DZ of points around a target point P1, a slope of the target point P1 is determined. In that case, slopes of surfaces each of which is formed by three points are averaged and the resultant may be regarded as the slope.

In the case where the slope (slope data DK) is zero degree, the surface corresponding to the slope, i.e., coordinate data DZ of the surface faces the optical axis of the three-dimensional measurement device 2. In the case where the slope is 90 degrees, the surface corresponding to the slope, i.e., coordinate data DZ of the surface faces at right angles to the optical axis of the three-dimensional measurement device 2.

The selection portion 118 selects only coordinate data DZ having slope data DK falling within a range RG between a threshold th4 and a threshold th5. The threshold th4 may be adjusted to have a value of zero degree, and the threshold th5 may be adjusted to have a value of 45 degrees or 60 degrees.

Sliders BS4 and BS5 for setting and adjusting the thresholds th4 and th5 respectively may be displayed together with other sliders BS1, BS2, and BS3 described above, or may be displayed individually. The respective sliders BS1-BS5 can be operated to adjust the area of a distance image GK displayed on a window WK.

Referring to FIG. 20, measurement data DS obtained as a result of measurement using the three-dimensional measurement device 2 are stored in the memory 111 (#31). With respect to luminance distribution DLK for each line column signal DL, a gravity center position PJ is determined. Alternatively, a Gaussian function GUK approximating to the luminance distribution DLK is determined and a peak position PP of the Gaussian function GUK is detected (#32).

An operation for three-dimensional processing is performed based on the gravity center position PJ or the peak position PP to obtain coordinate data DZ (#33). A slope (slope data DK) is determined based on the coordinate data DZ (#34). Only coordinate data DZ having slope data DK falling within a range RG set by a user are selected (#35 and #36), and a distance image GK based on the coordinate data DZ thus selected is displayed (#37). When the user changes the range RG, a distance image GK is displayed accordingly (#35-#37).

Other Embodiments

In the embodiments described above, the shape, the size, the operating method, and the number of sliders BS may be other than those described above. The keyboard 3c itself can be used as the sliders BS instead of displaying the sliders BS on the display screen HG. A dedicated slider BS may be provided.

In the embodiments described above, the size of the sensor 53, the number of pixels in a line column signal DL in one field, and the number of times of sampling per image-pickup may be set to values other than those described above.

Further, the first through third embodiments may be combined with one another.

In the embodiments described above, the host computer 3 performs an operation for three-dimensional processing based on measurement data DS obtained by the three-dimensional measurement device 2, and displays a distance image GK. However, another configuration is possible in which the three-dimensional measurement device 2 has those functions, performs an operation for three-dimensional processing, and displays a distance image GK. Yet another configuration is also possible.

In the embodiments described above, the overall configuration or the configurations of various portions of the three-dimensional processor SST, the three-dimensional measurement device 2, the host computer 3, and the three-dimensional measurement system 1, the structure, the shape, the size, the quantity, the image content, the processing details, the processing order and the like may be modified in accordance with the subject matter of the present invention.

The maximum value calculation portion 114, the approximation error detection portion 123, and the slope detection portion 127 in the embodiments described above correspond to an obtaining portion according to the present invention. The sliders BS1-BS5 correspond to an adjustment portion according to the present invention. The selection portion 118 corresponds to a display controller according to the present invention. The button BTK corresponds to a switching portion according to the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for controlling display of three-dimensional data in a three-dimensional processor, the three-dimensional processor processing three-dimensional data indicating three-dimensional position coordinates of each point on a surface of an object to be measured, the three-dimensional data being obtained by projecting measurement light onto the object and receiving measurement light reflected from the object, the method comprising:
   obtaining reliability data that are an index of reliability of three-dimensional data of said each point;
   enabling a user to adjust a threshold for defining a range of the reliability; and
   displaying, on a screen of a display, three-dimensional data corresponding to reliability falling within a range defined by the threshold adjusted by the user with the three-dimensional data displayed distinguishably from different three-dimensional data.

2. The method according to claim 1,
   wherein when a plurality of pieces of three-dimensional data obtained as a result of measurement performed on different surfaces of the object is displayed concurrently on an identical screen, with respect to each of the plurality of pieces of three-dimensional data, only three-dimensional data corresponding to the reliability falling within the range defined by the threshold adjusted by the user are displayed.

3. The method according to claim 1, wherein the reliability data are signal intensity upon receiving the measurement light reflected from the object.

4. The method according to claim 1, wherein the reliability data are an approximation error occurring when luminance distribution in a line column signal based on a signal upon receiving the measurement light reflected from the object is approximated to a Gaussian function.

5. The method according to claim 1, wherein the reliability data are a slope, with respect to the measurement light, of a surface formed based on the three-dimensional data.

6. The method according to claim 1, wherein a slider is displayed on the screen, and the slider is operated by the user thereby to adjust the threshold.

7. A three-dimensional processor configured to process three-dimensional data indicating three-dimensional position coordinates of each point on a surface of an object to be measured, the three-dimensional data being obtained by projecting measurement light onto the object and receiving measurement light reflected from the object, the three-dimensional processor comprising:
   a display including a screen for displaying the three-dimensional data;
   an obtaining portion obtaining reliability data that are an index of reliability of three-dimensional data of said each point;
   an adjustment portion enabling a user to adjust a threshold for defining a range of the reliability; and
   a display controller controlling the display to display, on the screen, three-dimensional data corresponding to reliability falling within a range defined by the threshold adjusted by the user with the three-dimensional data displayed distinguishably from different three-dimensional data.

8. The three-dimensional processor according to claim 7, wherein the obtaining portion obtains, as the reliability data, at least one of signal intensity upon receiving the measurement light reflected from the object, an approximation error occurring when luminance distribution in a line column signal based on a signal upon receiving the measurement light reflected from the object is approximated to a Gaussian function, and a slope, with respect to the measurement light, of a surface formed based on the three-dimensional data.

9. The three-dimensional processor according to claim 7, wherein the display controller controls the display to display, when a plurality of pieces of three-dimensional data obtained as a result of measurement performed on different surfaces of the object is displayed concurrently on an identical screen, with respect to each of the plurality of pieces of three-dimensional data, only three-dimensional data corresponding to the reliability falling within the range defined by the threshold adjusted by the user.

10. The three-dimensional processor according to claim 9, further comprising a switching portion determining whether the threshold set by the adjustment portion is applied to all of the plurality of pieces of three-dimensional data collectively or applied to the plurality of pieces of three-dimensional data individually.

11. A computer-readable storage medium storing a program for use in a computer that processes three-dimensional data indicating three-dimensional position coordinates of each point on a surface of an object to be measured, the program causing the computer to perform the steps of:
   obtaining reliability data that are an index of reliability of three-dimensional data of said each point;
   enabling a user to adjust a threshold for defining a range of the reliability; and
   controlling a display to display, on a screen of the display, three-dimensional data corresponding to reliability falling within a range defined by the threshold adjusted by the user with the three-dimensional data displayed distinguishably from different three-dimensional data.

* * * * *